UNITED STATES PATENT OFFICE.

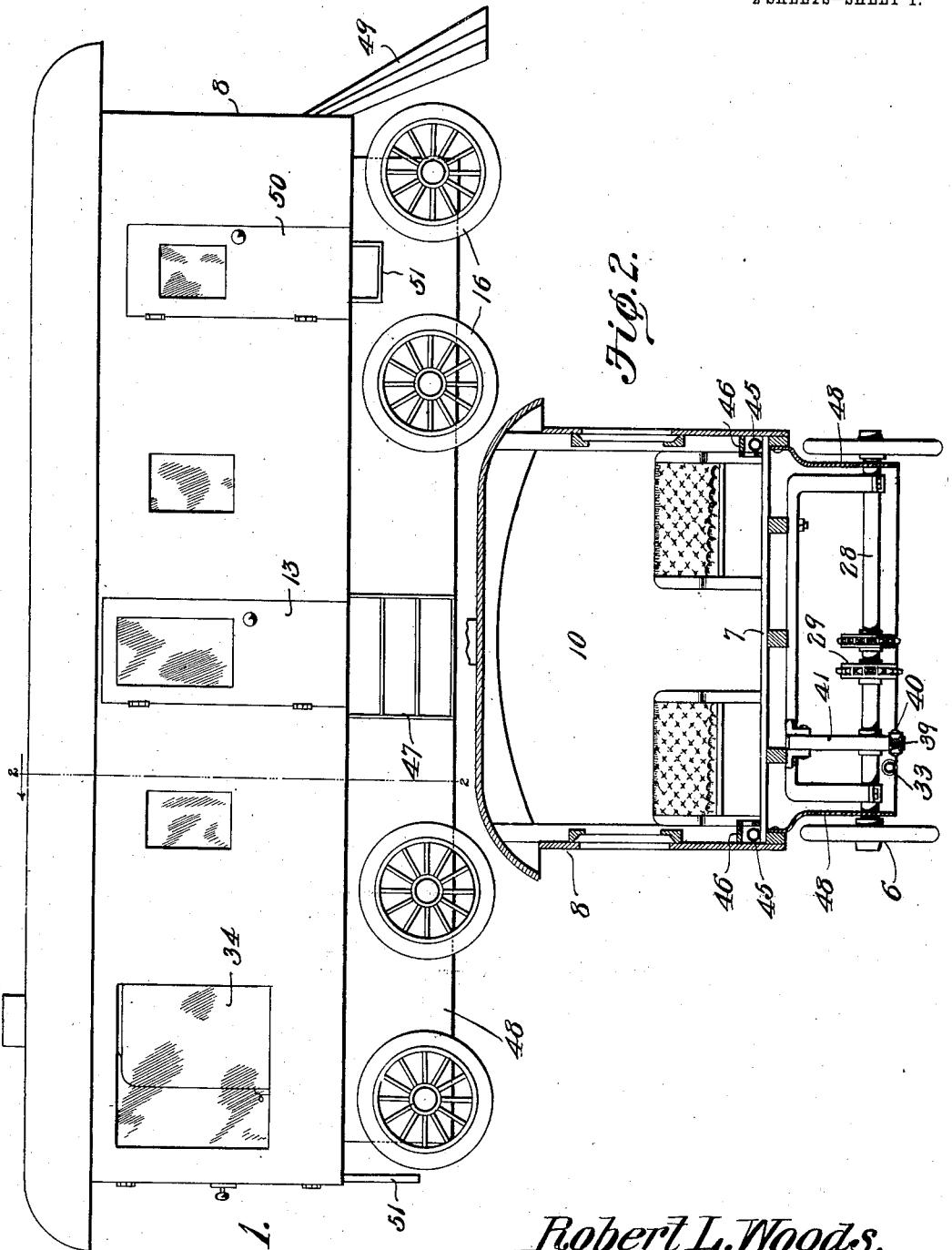

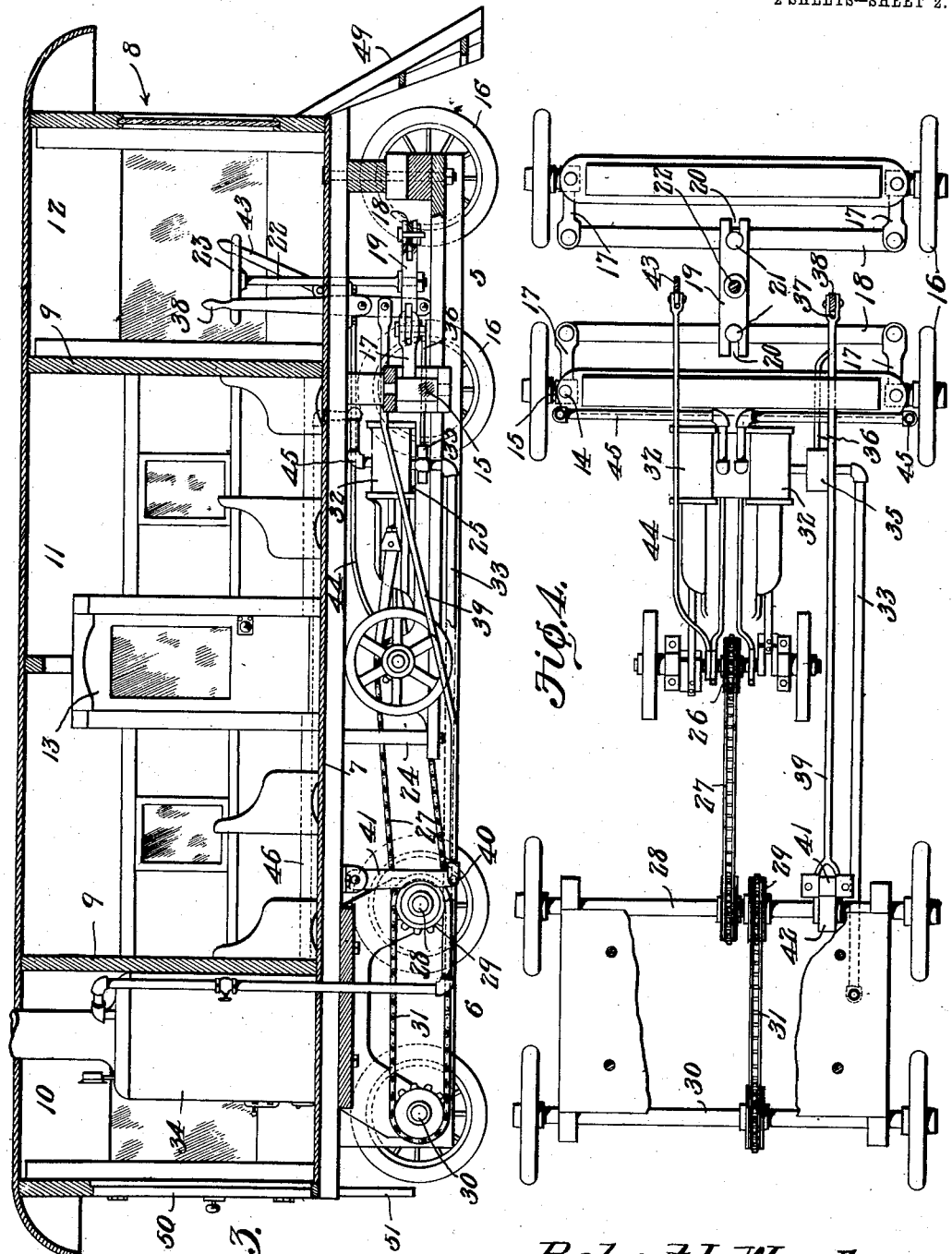

ROBERT L. WOODS, OF NASHVILLE, TENNESSEE, ASSIGNOR OF ONE-THIRD TO SOLOMON P. HARRIS, OF NASHVILLE, TENNESSEE.

OVERLAND STEAM-COACH.

No. 884,882.      Specification of Letters Patent.      Patented April 14, 1908.

Application filed March 1, 1906, Serial No. 303,712. Renewed February 13, 1908. Serial No. 415,764.

*To all whom it may concern:*

Be it known that I, ROBERT L. WOODS, a citizen of the United States, residing at Nashville, in the county of Davidson and State of Tennessee, have invented a new and useful Overland Steam-Coach, of which the following is a specification.

This invention relates to road vehicles or coaches, and has for its object to provide a vehicle in which the wheels of the forward truck are mounted for rotation on pivoted stub axles connected by bars or links to the steering mechanism whereby the movement of one pair of wheels will effect the movement of the other.

A further object of the invention is to provide means for heating the interior of the coach or vehicle by the exhaust steam from the engine, and further to provide means for actuating the cut-off valve and simultaneously operating the brakes.

A still further object of the invention is to generally improve this class of devices so as to add to their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification:—Figure 1 is a side elevation of a road vehicle or coach constructed in accordance with my invention. Fig. 2 is a transverse sectional view taken on the line 2—2 of Fig. 1. Fig. 3 is a longitudinal sectional view. Fig. 4 is a top plan view with the vehicle body removed.

Similar numerals of reference indicate corresponding parts in all of the figures of the drawings.

The vehicle or coach consists of the forward truck 5 and the rear truck 6 secured in any suitable manner to the platform 7.

Mounted on the platform 7 is the vehicle body 8, the interior of which is divided by transverse partitions 9 forming a plurality of compartments 10, 11 and 12, the intermediate compartment 11 being provided with a plurality of seats to accommodate the passengers, and having a door 13 formed in one wall of the compartment to permit the entrance and exit of the passengers.

Pivoted to the forward truck at 14 are stub axles 15 upon which are mounted for rotation a plurality of sets of wheels 16 and extending laterally from said stub axles are angular arms 17 pivotally connected by bars or links 18. The bars or links 18 are also connected by a bar 19 extending longitudinally of the vehicle and having its opposite ends bifurcated at 20 for the reception of bolts or similar fastening devices 21 secured to said links as shown. Fastened in any suitable manner to the cross bar 19 is the steering mechanism preferably in the form of a vertical shaft 22 provided with a hand wheel 23 which extends within the compartment 12 for operation by the driver or motorman.

Depending from the platform 7 is a supporting frame 24 upon which is mounted an engine 25, having a sprocket wheel 26 secured to the driving shaft and connected through the medium of a sprocket chain 27 to the front axle 28 of the rear truck 6. Mounted for rotation with the axle 28 is a sprocket wheel 29 connected to the rear axle 30 by a similar sprocket chain 31 so that motion will be transmitted from the engine to the several wheels comprising the rear truck.

Steam is admitted to the cylinders 32 through the medium of a pipe 33, one end of which communicates with a boiler 34 arranged within the compartment 10 while the opposite end thereof is threaded or otherwise secured to a throttle or cut-off valve 35. Connected to the throttle valve 35 is a rod 36 the opposite end of which is bifurcated at 37 and pivoted in any suitable manner to a lever 38 extending through the platform 7 and arranged within convenient distance of the motorman.

Pivoted to an intermediate portion of a lever 38 is a brake rod 39 which in turn is pivoted at 40 to a brake bar or shoe 41 suspended from the bottom of the platform 7 and adapted to engage a brake drum 42 secured to an axle 28.

The rods 36 and 39 are connected to the lever 38 in such a manner that the initial movement of the lever in one direction will cut off the supply of steam to the cylinders 32 and a further movement thereof actuate the rod 39 to apply the brakes, and when the lever is moved in the opposite direction the brakes will be released and the steam subsequently admitted to the cylinders. It will thus be seen that a partial movement of the lever 38 will stop the engine without applying the brakes so as to permit the vehicle to travel under its own momentum in coasting down hills and that a further movement of the lever will apply the brakes and bring the vehicle to a stand-still. A reversing lever 43 extends through the platform 7 with its lower end connected by a rod or bar 44 to the reversing mechanism arranged on the driving shaft of the engine whereby the engine may be reversed at will.

As a means for heating the interior of the vehicle, or coach, suitable pipes 45 are connected to the exhaust ports of the engine cylinders and extended longitudinally of the vehicle, being housed or protected by suitable casings 46.

The roof of the coach is preferably spaced a short distance from the transverse partitions to permit the proper ventilation of the coach while suitable steps 47 depend from the platform 7 at the door 13 to permit ready access to the interior of the coach.

The operating mechanism is preferably protected by a casing 48 secured to the platform 7 while the forward end of the vehicle is provided with a fender 49 to assist in removing any obstructions in the path of the vehicle. The rear compartment 10 and the forward compartment 12 are each provided with a door 50 and a depending step 51 to assist the motorman in mounting the vehicle.

From the foregoing description it is thought that the construction and operation of the device will be readily understood by those skilled in the art and further description thereof is deemed unnecessary.

Having thus described the invention what is claimed is:—

1. The combination with a vehicle body, of the front and rear trucks, a plurality of sets of wheels pivotally mounted for rotation on the forward truck, and means connecting said wheels whereby the movement of one set of wheels will effect the movement of the other.

2. The combination with a vehicle body, of the front and rear trucks, a plurality of sets of wheels pivotally mounted for rotation on the forward truck, a link connecting each set of wheels, a bar connecting said links, and a steering head secured to the bar whereby the movement of one set of wheels will effect the movement of the other.

3. The combination with a vehicle body, of the front and rear trucks, stub axles pivoted to the forward truck, a plurality of sets of wheels mounted for rotation on the stub axles, links connecting the stub axles, a bar connecting the links, and a steering head operatively connected with the bar whereby the movement of one set of wheels will effect the movement of the other.

4. The combination with a vehicle body, of the front and rear trucks, stub axles pivotally mounted on the forward truck, wheels mounted for rotation on the stub axles, links connecting said stub axles and provided with pins or projections, a bar having its opposite ends bifurcated for the reception of said pins, and a steering head connected to the bar whereby the movement of one set of wheels will effect the movement of the other.

5. The combination with a vehicle body, of the front and rear trucks, a plurality of sets of wheels pivotally mounted on the rear truck and provided with traction wheels, a motor, means connecting the motor and the rear truck for propelling the latter, and means connecting the wheels of the forward truck whereby the movement of one set of wheels will effect the movement of the other.

6. The combination with a vehicle body, of the front and rear trucks, stub axles pivotally mounted on the forward trucks, wheels mounted for rotation on the stub axles, links connecting the wheels, a pair of axles journaled on the rear truck and provided with traction wheels, a motor operatively connected with one of the rear axles, means for transmitting motion from one axle to the other, a bar having its opposite ends slotted for pivotal connection with the links, and a steering head secured to the bar.

In testimony that I claim the foregoing as my own, I have hereto affixed my signature in the presence of two witnesses.

ROBERT L. WOODS.

Witnesses:
DAVID R. DAVIDSON,
CHAS. WATKINS.